Dec. 21, 1948.  H. G. FROSTICK  2,456,936
REGULATOR SYSTEM
Filed April 16, 1947
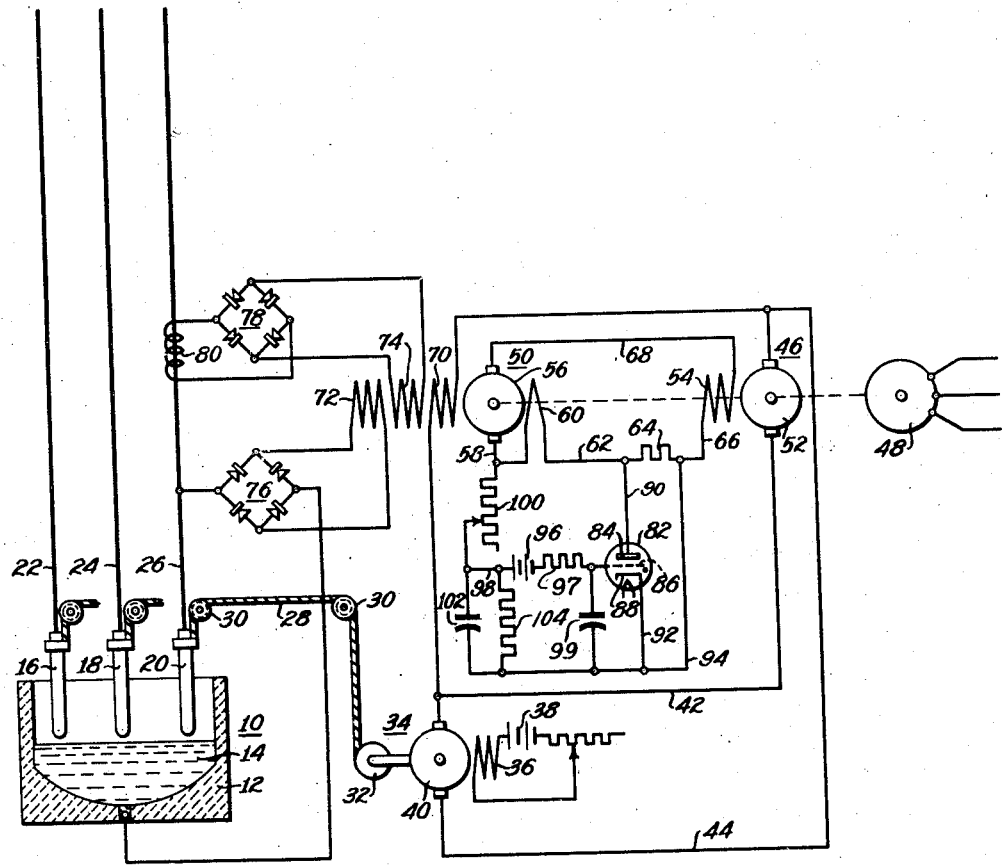
WITNESSES:
Robert C. Baird
Nw. L. Groome
INVENTOR
Harold G. Frostick.
BY
James N. Ely
ATTORNEY Patented Dec. 21, 1948

2,456,936

UNITED STATES PATENT OFFICE 2,456,936

REGULATOR SYSTEM

Harold G. Frostick, Pittsburgh, Pa., assignor to Westinghouse Electric Corporation, East Pittsburgh, Pa., a corporation of Pennsylvania Application April 16, 1947, Serial No. 741,726

6 Claims. (Cl. 314—75)

This invention relates to regulator systems and, in particular to furnace-regulator systems for governing the operation of movable electrodes of electric arc furnaces.

An object of this invention is to provide a regulating system for arc furnaces in which provision is made for accelerating the operation of the electrode motor under predetermined conditions of the arc.

Another object of this invention is to provide in a furnace regulator system having an electrode motor controlled by a generator, for controlling the excitation of the generator by means of an exciter generator whose voltage is governed by the interaction of a pair of opposed control field windings energized in accordance with the arc current and arc voltage, and to provide for accelerating the excitation of the generator under predetermined operating conditions of the exciter generator.

A further object of this invention is to provide an electric discharge valve in a furnace regulator system having an electrode motor controlled by a generator the excitation of which is controlled by an exciter generator whose voltage is governed by the interaction of a pair of opposed control field windings energized in accordance with the arc current and arc voltage which will be rendered conducting under predetermined operating conditions of the exciter generator to establish a circuit and provide for accelerating the excitation of the generator.

Another object of this invention is to provide a regulating system for arc furnaces in which an electric valve circuit is provided for operation in response to a predetermined electrical condition of the arc to effect an acceleration in the operation of the electrode motor while providing time delay to prevent instantaneous operation of the electric valve upon the occurrence of said predetermined electrical condition of the arc.

Other objects of this invention will become apparent from the following description when taken in conjunction with the accompanying drawing, the single figure of which is a diagrammatic view of circuits and apparatus illustrating an embodiment of this invention.

Referring to the drawing, an arc furnace 10 is illustrated having a metal receptacle or shell 12 containing a bath of material 14 and having three movable electrodes 16, 18 and 20 positioned adjacent thereto. The electrodes 16, 18 and 20 are directly connected to conductors 22, 24 and 26, respectively, which are connected to a suitable source of power through a power transformer (not shown). Means such as a flexible cable 28 and pulleys 30 are provided, being associated with each of the electrodes for raising and lowering the electrode. Since identical operating mechanism is provided for controlling the positioning of each electrode, only one of the operating mechanisms is illustrated in detail.

As illustrated the flexible cable 28 may be wound upon a winding drum 32 operated by a reversible electrode motor 34. The electrode motor 34 comprises a field winding 36 disposed to be energized from any suitable direct-current source, such as the battery 38, and an armature winding 40 connected by conductors 42 and 44 to be supplied with energy from a main generator 46 that is driven by an alternating-current motor 48 and excited by an exciter generator 50.

The main generator 46 comprises an armature winding 52 connected across conductors 42 and 44 and a field winding 54 disposed to be supplied with energy from the armature winding 56 of the exciter generator 50. As illustrated, one terminal of the armature winding 56 is connected through conductor 58, a self-exciting field winding 60 for the exciter generator 50, conductor 62, resistor 64 and conductor 66 to a terminal of the field winding 54, the other terminal of the armature winding 56 being connected by conductor 68 to the other terminal of the field winding 54 of the main generator 46. The exciter generator 50 is also provided with a field winding 70 connected to be energized in accordance with the output of the main generator 46 to provide anti-hunt characteristics and two control field windings 72 and 74 which are disposed to be so energized as to oppose each other and to cooperate in controlling the excitation of the exciter generator 50.

The control field winding 72 is connected across the output terminals of a rectifier 76, one of the input terminals of which is connected to conductor 26 feeding electrode 20 and the other of the input terminals being connected to the casing or shell 12 of the furnace 10. The control field winding 72 is thus energized at a voltage that is a measure of the drop in voltage across the furnace arc.

The control field winding 74 is connected across the output terminals of a full-wave rectifier 78, the input terminals of which are connected to a current transformer 80 which is inductively associated with phase conductor 26 whereby the field winding 74 is supplied with unidirectional current that is a measure of the alternating current flowing through the phase conductor 26 and the arc of that phase in the furnace 10.

In order to shunt the resistor 64 in the field winding circuit of the main generator 46 under predetermined operating conditions of the exciter generator 50 as will be explained more fully hereinafter, an electric discharge valve 82 having an anode 84, grid 86 and cathode 88 is connected to shunt the resistor 64 when the valve 82 is rendered conducting. Thus the anode 84 is connected by conductor 90 to the conductor 62 and the cathode 88 is connected by conductors 92 and 94 to conductor 66 at the opposite terminals of the resistor 64.

The valve 82 is of the well known thyratron type, the conductivity being controlled by superimposing a positive biasing potential on a negative biasing potential so that the resultant grid-cathode potential becomes more positive than the critical potential of the valve and the valve becomes conducting. Thus control of the valve 82 is obtained by varying the positive biasing potential.

As illustrated a negative biasing potential is applied to the grid 86 from the battery 96 whereas the positive biasing potential is applied in accordance with the potential of the anode 84 which potential is dependent upon the output of the direct current exciter generator 50. Thus the grid 86 is connected through the battery 96, conductor 98 and adjustable resistor 100 to conductor 58 through which the anode 84 is connected to the terminal of the exciter generator 50.

In order to introduce a time delay action in rendering the grid 86 positive, a capacitor 102 is connected between the conductor 98 and conductor 94 disposed to be charged by the positive potential from the exciter generator 50. The time for charging the capacitor 102 can be adjusted somewhat by changing the connection to adjustable resistor 100. As the adjustable resistor 100 may be large, it is desirable to provide a resistor 104 in parallel with the capacitor 102 to obtain an efficient path for carrying off the charge of the capacitor 102 when the valve 82 is rendered conducting.

As is customary, a grid resistor 97 is connected in circuit between the battery 96 and the grid 86 to limit the grid current, and a capacitor 99 is connected as the grid filament capacitor for short circuiting the high frequency oscillations and increasing the grid filament capacitance.

When the operation of the furnace is started, the three electrodes 16, 18 and 20 are in a raised position out of contact with the body of the material 14 which is to be melted in the heated receptacle 12. Under these conditions current does not flow through the electrodes 16, 18 and 20, but the voltage between the electrodes 16, 18 and 20 and the shell 12 will be a maximum whereby only the voltage responsive control field winding 72 of the exciter generator 50 will be fully energized. The control field winding 72 thus excites the exciter generator 50 to develop a voltage whereby the terminal connected to conductor 68 is positive and the terminal connected to conductor 58 is negative so that when the voltage is applied to the field winding 54 of the main generator 46 the generator 46 will build up in a direction to operate the motor 34 to move the electrode 20 downwardly.

As the exciter voltage in the armature 56 builds up, the flow of current through the self-energizing winding 60 increases to increase the rate of voltage buildup of the exciter generator 50 thus causing this voltage to build up more rapidly than it otherwise would. As the voltage of the main generator 46 builds up, as a result of the increasing energization of the main generator field winding 54, a correspondingly increasing voltage is impressed upon the field winding 70 from the main generator armature 52, which opposes the effect of the self-energizing field winding 60 to introduce anti-hunting action for limiting the rapidly increasing output voltage of the exciter generator 50. At the same time it is noted that a negative potential is impressed on the grid 86 of the valve 82 from the connection with conductor 58 and the valve 82 is maintained nonconducting.

When the three electrodes 16, 18 and 20 are being lowered and the first one engages the bath 14, the voltage of the arc impressed across rectifier 76 and consequently across the control field winding 72 collapses or drops to a very low value. Thus, in effect, the control field winding 72 is shorted out of service and as the voltage on the control field winding 72 collapses it causes a corresponding reduction in the output voltage of the exciter generator 50 and of the main generator 46, which is applied to the electrode motor 34. As will be appreciated, the field winding 70 also opposes the residual effect of the control field winding 72, the field windings 60 and 70 functioning to neutralize the effect of the control winding 72 and also the effect of residual magnetism in the exciter generator 50 to decrease its output to substantially zero and thus stop the operation of the electrode motor 34.

When one of the other electrodes 16 or 18 is lowered sufficiently to also engage the bath 14, a current starts to flow through the bath between the electrodes and a resistance drop in voltage between the electrodes and the casing 12 appears thus causing a further decrease in the voltage between the electrodes and the casing 12 and on the control field winding 72. The effect of the control field winding 72 on the exciter generator 50 is in a direction to tend to operate the motor 34 in a direction to lower the electrode 20 as explained hereinbefore. However, since current is now flowing through conductor 26, a voltage is applied from the current transformer 80 through rectifier 78 to the control field winding 74 in a direction to oppose the flux developed by the field winding 72. The direction in which the motor 34 will now operate is, therefore, dependent upon which of the two control field windings 72 and 74 predominates.

When the flux produced by the field winding 74 is greater than that produced by the control field winding 72, the flux will cause the exciter generator 50 to develop a voltage having a polarity such that the terminal of the exciter generator 50 connected to conductor 58 is positive and the terminal connected to conductor 68 is negative whereby the field winding 54 of the main generator 46 is energized in a direction to impress a voltage on the motor armature 40 having a polarity to cause the motor 34 to operate in a direction to raise the electrode 20. In a similar manner if the flux developed by the control field winding 72 is greater than that developed by the control field winding 74, the polarity of the voltage developed by the exciter generator 50 will be reversed thus impressing a voltage on the armature 40 of the motor 34 such as to cause the electrode 20 to be lowered. When the electrode is raised the arc is lengthened, the arc current decreases and the arc voltage increases and, when the electrode is lowered the arc current is increased and the arc voltage is decreased. The resulting effect is to move the electrode 20 to such a position that the flux developed by the two control field windings 72 and 74 neutralize each other in which position the electrode motor 34 will be at rest.

During the normal operation of the system of this invention the electrode 20 is maintained in a substantially constant position relative to the bath of material 14 so that the energization of the control field windings 72 and 74 are substantially equal and in position to neutralize each other. During such normal operation, the valve 82 remains nonconducting for if the energization of control field winding 72 predominates a negative bias is applied to the grid 86 or if the energization of control field winding 74 predominates, the resulting positive bias is too small to overcome the negative bias of the battery 96 or the corrective action resulting from the energization of control field winding 74 is of too short a duration to impress a positive bias on the grid 86.

If, however, during the operation of the furnace, the bath of material 14 should cave in on the electrode 20 thereby causing a short circuit, a large current flows through conductor 26 and electrode 20 with the result that the control field winding 74 is energized at a maximum and the output voltage of the exciter generator 50 is correspondingly increased. As the positive polarity at conductor 58 is thus increased, the capacitor 102 is charged, the rate of charging and consequently the time delay in reaching maximum charge depending upon the setting of adjustable resistor 100. The size of the capacitor 102, of course, can be selected to determine the output of the exciter generator at which it is desired to fire the valve 82. When the capacitor 102 is charged, the positive bias is then applied to the grid 86 to render it more positive and cause the valve 82 to become conducting. Under such circumstances, the valve 82 is effective for shunting the resistor 64 whereby the energization of the field winding 54 is greatly increased to accelerate the operation of the motor 34 to raise the electrode 20. The valve 82 remains conducting until the electrode 20 is raised to a position to clear the fault whereby the anode voltage of valve 82 decreases to less than the voltage required for operation of the valve or if the required anode voltage is zero then until the control field winding 72 is energized to predominate over the energization of control field winding 74 to cause a reversal of the polarity of the exciter generator 50.

As will be appreciated the valve 82 is operative only in response to predetermined load conditions at the furnace with a resulting predetermined operation of the exciter generator 50 and then only if a predetermined time interval has elapsed after the occurrence of such predetermined operation of the exciter generator 50. Thus momentary faults will not be of sufficient duration to cause the valve 82 to become conducting and hunting caused by such momentary faults will be at a minimum. The action of the valve 82 is however sufficiently fast to cause the accelerated operation of the electrode motor 34 when needed.

By utilizing the system of this invention, a very sensitive control of the positioning of the electrodes in an arc furnace is obtained without the use of relays or mechanical parts which require servicing. The system can be readily duplicated as it is constructed of standard components.

I claim as my invention:

1. In a furnace-regulator system, a movable electrode, a regulator for governing the operation of said electrode and comprising an electrode motor, a main generator for supplying energy thereto in either of two polarities for operating the motor in either of two directions, a field winding having a resistor in circuit relation for the main generator, an exciter generator for controlling the energization of the main generator field winding, the exciter generator having a plurality of control field windings energized in accordance with the electrical conditions of the electrode circuit, the exciter generator having a polarity dependent upon the energization of the control field windings, and an electric discharge valve disposed to be rendered conducting to shunt the resistor in circuit with the field winding of the main generator under predetermined polarity and operating conditions of the exciter generator.

2. In a furnace-regulator system, the combination comprising, a movable electrode, a motor for operating the electrode, a main generator for supplying energy to the motor to regulate the arc, a field winding having a resistor in circuit relation therewith disposed to be energized for controlling the excitation of the main generator, an exciter generator connected to control the energization of the field winding of the main generator, a pair of oppositely energized control field windings for the exciter generator, means for energizing one of said pair of control field windings with a current that is a measure of the voltage across the arc, means for energizing the other one of said pair of control field windings with a current that is a measure of the current flowing through the arc, the exciter generator having a polarity dependent upon the predominant energization of the opposed control field windings, and an electric discharge valve disposed to be rendered conducting under predetermined polarity and operating conditions of the exciter generator to shunt the resistor in circuit with the field winding of the main generator to accelerate the operation of the motor.

3. In a furnace-regulator system, the combination comprising, a movable electrode, a motor disposed to be operated for raising and lowering the electrode, a main generator for supplying energy to the motor, a field winding having a resistor in circuit relation therewith disposed to be energized for controlling the excitation of the main generator, an exciter generator connected to control the energization of the field winding of the main generator, a pair of oppositely energized control field windings for the exciter generator, means for energizing one of said pair of control field windings with a current that is a measure of the voltage across the arc, means for energizing the other one of said pair of control field windings with a current that is a measure of the current flowing through the arc, the exciter generator having a polarity dependent upon the predominant energization of the opposed control field windings, an electric discharge valve disposed to shunt the resistor in circuit with the field winding of the main generator, the electric valve having a grid to be utilized for controlling the conductivity thereof, and means for controlling the bias on the grid in response to a predetermined polarity and operating condition of the exciter generator to render the valve conducting and thereby effect the shunting of the resistor to increase the excitation of the main generator and accelerate the operation of the electrode motor.

4. In a furnace-regulator system, the combination comprising, a movable electrode, a motor disposed to be operated for raising and lowering the electrode, a main generator for supplying energy to the motor, a field winding having a resistor in circuit relation therewith disposed to be energized for controlling the excitation of the main generator, an exciter generator connected to control the energization of the field winding of the main generator, a pair of oppositely energized control field windings for the exciter generator, means for energizing one of said pair of control field windings with a current that is a measure of the voltage across the arc, means for energizing the other one of said pair of control field windings with a current that is a measure of the current flowing through the arc, the exciter generator having a polarity dependent upon the predominant energization of the opposed control field windings, an electric discharge valve disposed to be rendered conducting to shunt the resistor in circuit with the field winding of the main generator, the electric valve having a grid to be utilized for controlling the conductivity thereof, and a control circuit for controlling the bias on the grid to render the electric valve conducting only upon the occurrence of a predetermined polarity and operation of the exciter generator to shunt the resistor and thereby increase the excitation of the main generator and accelerate the operation of the electric motor.

5. In a furnace-regulator system, the combination comprising, a movable electrode, a motor disposed to be operated for raising and lowering the electrode, a main generator for supplying energy to the motor, a field winding having a resistor in circuit relation therewith disposed to be energized for controlling the excitation of the main generator, an exciter generator connected to control the energization of the field winding of the main generator, a pair of oppositely energized control field windings for the exciter generator, means for energizing one of said pair of control field windings with a current that is a measure of the voltage across the arc, means for energizing the other one of said pair of control field windings with a current that is a measure of the current flowing through the arc, the exciter generator having a polarity dependent upon the predominant energization of the opposed control field windings, an electric discharge valve disposed to be rendered conducting to shunt the resistor in circuit with the field winding of the main generator, the electric valve having a grid to be utilized for controlling the conductivity thereof, a control circuit for controlling the bias on the grid to render the electric valve conducting only upon the occurrence of a predetermined polarity and operation of the exciter generator to shunt the resistor and thereby increase the excitation of the main generator and accelerate the operation of the electrode motor, and a capacitor in said control circuit to provide a time delay upon the occurrence of said predetermined polarity and operation of the exciter generator before the electric valve is rendered conducting.

6. In a furnace-regulator system, the combination comprising, a movable electrode, a motor disposed to be operated for raising and lowering the electrode, a main generator for supplying energy to the motor, a field winding having a resistor in circuit relation therewith disposed to be energized for controlling the excitation of the main generator, an exciter generator connected to control the energization of the field winding of the main generator, a pair of oppositely energized control field windings for the exciter generator, means for energizing one of said pair of control field windings with a current that is a measure of the voltage across the arc, means for energizing the other one of said pair of control field windings with a current that is a measure of the current flowing through the arc, the exciter generator having a polarity dependent upon the predominant energization of the opposed control field windings, an electric discharge valve disposed to be rendered conducting to shunt the resistor in circuit with the field winding of the main generator, the electric valve having a grid to be utilized for controlling the conductivity thereof, and means for rendering the bias on the grid positive and the valve conducting only when said other one of the pair of control field windings is energized to effect a predetermined polarity and operation of the exciter generator, said positive biasing means including a capacitor to provide a time delay upon the occurrence of said predetermined polarity and operation of the exciter generator before the electric valve is rendered conducting.

HAROLD G. FROSTICK.

REFERENCES CITED

The following references are of record in the file of this patent:

UNITED STATES PATENTS

| Number | Name | Date |
|---|---|---|
| 1,957,064 | Hopkins | May 1, 1934 |
| 1,994,076 | Kuhle et al. | Mar. 12, 1935 |
| 2,007,751 | Chapman | July 9, 1935 |
| 2,119,715 | Miner | June 7, 1938 |
| 2,121,588 | Eames | June 21, 1938 |
| 2,419,988 | Davis | May 6, 1947 |
| 2,442,003 | Harris | May 25, 1948 |